United States Patent
Zhang et al.

(10) Patent No.: US 11,223,073 B2
(45) Date of Patent: Jan. 11, 2022

(54) THRESHOLD DISCHARGING C-RATES FOR BATTERY CELLS IN LOW TEMPERATURE ENVIRONMENTS

(71) Applicant: CHONGQING JINKANG POWERTRAIN NEW ENERGY CO., LTD., Chongqing (CN)

(72) Inventors: Wenke Zhang, Santa Clara, CA (US); Brennan Campbell, Santa Clara, CA (US); Ying Liu, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 416 days.

(21) Appl. No.: 16/289,571

(22) Filed: Feb. 28, 2019

(65) Prior Publication Data
US 2020/0280110 A1    Sep. 3, 2020

(51) Int. Cl.
*H01M 10/625*    (2014.01)
*H01M 10/44*    (2006.01)
*H01M 10/613*    (2014.01)

(52) U.S. Cl.
CPC ....... *H01M 10/443* (2013.01); *H01M 10/613* (2015.04); *H01M 10/625* (2015.04); *H01M 2220/20* (2013.01)

(58) Field of Classification Search
CPC .. H02J 7/0024; H02J 7/0071; H02J 7/007192; H01M 10/443; H01M 10/613; H01M 10/625; H01M 2220/20
USPC .......................................................... 320/125
See application file for complete search history.

(56) References Cited

U.S. PATENT DOCUMENTS

| | | | |
|---|---|---|---|
| 2009/0295590 A1* | 12/2009 | Black ............... | H02J 7/007194 340/636.2 |
| 2014/0333313 A1* | 11/2014 | Surampudi ........ | G01R 31/3647 324/426 |
| 2019/0305393 A1* | 10/2019 | Oguma ................... | B60L 58/13 |

\* cited by examiner

*Primary Examiner* — Richard Isla
*Assistant Examiner* — Mohammed J Sharief
(74) *Attorney, Agent, or Firm* — Cooper Legal Group, LLC (57) ABSTRACT

Techniques described herein relate generally to determining and applying threshold discharging C-rates for battery cells in low temperature environments. To combat internal resistance within a battery cell at low temperature, heat may be generated within a battery cell via a high discharge C-rate. A higher discharge C-rate may cause more heat generation with a battery cell and the higher temperature may mitigate the low temperature environment. As a result of the heat generation, a battery cell's capacity may be increased. Techniques described herein may identify, for a particular low temperature (0 degrees Celsius and below), a threshold discharge C-rate that if a battery cell is discharged above the threshold, the effect of temperature rising would be more dominant than the effect of the internal resistance and more capacity would be obtained from the battery cell.

20 Claims, 6 Drawing Sheets

THRESHOLD DISCHARGING C-RATES FOR BATTERY CELLS IN LOW TEMPERATURE ENVIRONMENTS

BACKGROUND

As battery technology, has become more advanced so have the use of batteries within electronic vehicles (EV). In some instances, such as commuter vehicles, EVs aim to replace traditional gas-combustion vehicles as EVs offer a more environmental friendly solution. However, in order for EVs to eventually replace gas-combustion vehicles, EVs must be able to operate in different conditions. A known drawback of EVs is their reduction of battery capacity at low temperatures. Internal resistance is an important property in batteries within EVs. The internal resistance of a battery may increase as the temperature of the cells within a battery decrease. Thus, when operating in a low temperature environment, the battery cells would have less capacity because of higher internal resistance. Therefore, there is a need for techniques to reduce the internal resistance within a battery cell at low temperatures in order improve battery performance in low temperature environments.

BRIEF SUMMARY

Techniques described herein relate generally to determining and applying threshold discharging C-rates for battery cells in low temperature environments. In one embodiment, a method for modifying a discharging C-rate of a battery within an EV is described. The method may comprise charging a first battery cell of a plurality of battery cells to a threshold state of charge (SoC). The method may further comprise, subsequent to charging the first battery cell, placing the first battery cell in a temperature controlled environment for a predetermined period of time. In one embodiment, the temperature controlled environment is maintained at a first temperature. The method may further comprise measuring, during a discharging of the first battery cell at a corresponding discharging C-rate, a battery cell temperature and a battery cell discharge capacity. The method may further comprise comparing the measured battery cell temperature and the measured battery cell discharge capacity to other measured battery cell temperatures and other measured battery cell discharge capacities associated with battery cells of the plurality of battery cells to determine a threshold discharging C-rate at the first temperature. The method may further comprise modifying a discharging C-rate of a battery within an EV based at least in part on the threshold discharging C-rate.

In one embodiment, the method may further comprise measuring, during a discharging of a battery cell at a corresponding discharging C-rate and the first temperature, a battery cell temperature and a battery cell discharge capacity, wherein each discharging C-rate is different for each battery cell.

In one embodiment, the method may further comprise modifying the temperature in the temperature controlled environment to a second temperature. In one embodiment, the second temperature may be lower than the first temperature. In one embodiment, for each of the battery cells in the plurality of battery cells, the method may further comprise measuring, during a discharging of a battery cell at a corresponding discharging C-rate and the second temperature, a battery cell temperature and a battery cell discharge capacity. In one embodiment, each discharging C-rate is different for each battery cell.

In one embodiment, the plurality of battery cells may be the same type of battery cells. In one embodiment, the threshold SoC may be 95%. In one embodiment, the first temperature is equal to or less than 0 degrees Celsius.

Features, embodiments, and advantages of the present disclosure are better understood when the following Detailed Description is read with reference to the accompanying drawings.

DETAILED DESCRIPTION

Techniques described herein relate generally to determining and applying threshold discharging C-rates for battery cells in low temperature environments. Battery cells, particularly of the lithium ion variety, may suffer from increases in internal resistance in low temperature environments. Internal resistance may be inverse to a battery cell's capacity (e.g., discharging capacity). As a result, when the temperature of a battery cell drops, the internal resistance of that battery cell may increase. An increase in battery cell's internal resistance may adversely affect the battery cell's discharge capacity. For example, a battery cell that provides 100 percent capacity at 27 degrees Celsius may only deliver 50 percent at −18 degrees Celsius. A battery cell's capacity may represent the total ampere-hours (amp-hours or Ah) available when being discharged at a particular discharge current (e.g. C-rate). For example, if a battery cell's capacity is 1 Ah (1000 mAh) then, in theory, 1 amp of current may be drawn from the battery cell for one hour. The C-rate may be the rate of discharge (or charge) as compared to the capacity of the battery cell. For example, a 1C discharge may indicate a current that would discharge a battery cell within an hour to a cut-off voltage. Similarly, a 0.5C rate may indicate a current that would discharge the same battery cell within 2 hours to the cut-off voltage. In addition, a 2C rate may indicate a current that would discharge the same battery cell within a half hour to the cut-off voltage. The cut-off voltage may be the minimum allowable voltage for a battery cell and it is the voltage that generally defines an "empty" state of a battery cell.

To combat internal resistance within a battery cell at low temperature, heat may be generated within a battery cell via a high discharge C-rate. A higher discharge C-rate may cause more heat generation with a battery cell and the higher temperature may mitigate the low temperature environment. As a result of the heat generation, a battery cell's capacity may be increased. Techniques described herein may identify, for a particular low temperature (0 degrees Celsius and below), a threshold discharge C-rate that if a battery cell is discharged above the threshold, the effect of temperature rising would be more dominant than the effect of the internal resistance and more capacity would be obtained from the battery cell. Conversely, if the battery cell is discharged below the threshold, the effect of internal resistance would be more dominant than the effect of the temperature increase resulting in less capacity from the battery cell. Once the threshold discharge C-rate is determined it may be applied to one or more battery cells within an EV in cold temperature environments.

Figure 1:
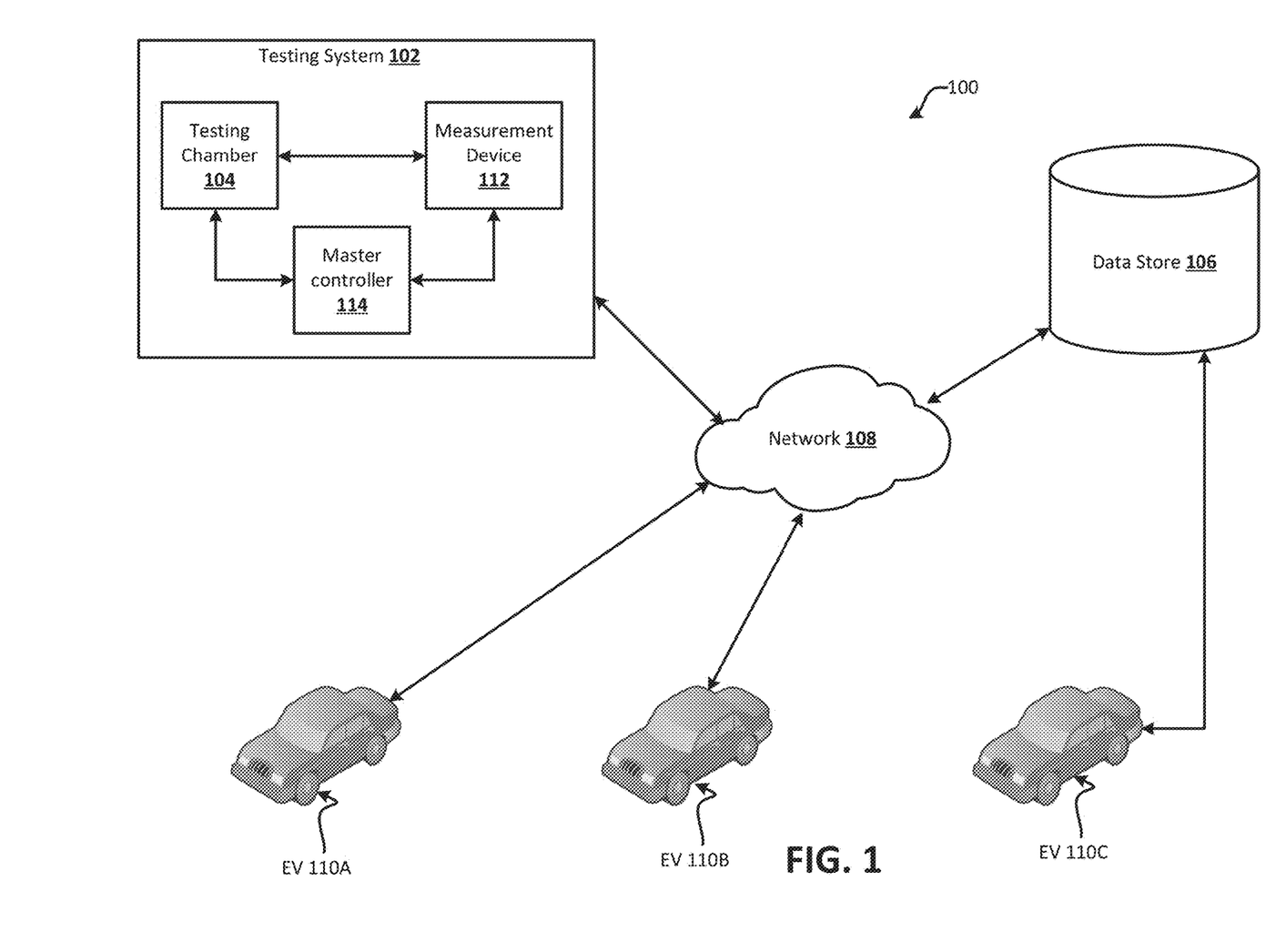
FIG. 1 illustrates an example system in accordance with one or more embodiments.

FIG. 1 illustrates example system 100 for implementing one or more embodiments. System 100 may comprise a testing system 102, a data store 106, a network 108, and EVs 110A-110C. Testing system 102, data store 106, and one or more EVs 110A-110C may be communicatively connected to each other via network 108. Testing system 102 includes testing chamber 104, measurement device 112, and master controller 114. In one embodiment, testing system 102 may be a fully are partially automated building containing battery cell holders, battery cells to be tested, devices that can detect voltage of a battery cell (e.g., measuring device 112), devices that can detect discharge capacity of a battery cell (e.g., measuring device 112), devices that can appropriate current to a battery cell, a master controller for controlling one or more operations of test system 102 (e.g., master controller 114) and other similar equipment. Testing system 102 may receive battery cells of different types and perform one or more processes to determine a threshold discharge C-rate for a particular battery cell type at a particular low temperature. A battery cell type may include a lithium cobalt oxide battery cell, a lithium manganese oxide battery cell, lithium iron phosphate battery cell, lithium nickel manganese cobalt oxide battery cell, lithium nickel cobalt aluminum oxide battery cell, lithium titanate, and the like. While a battery cell is within testing chamber 104, one or more processes may be performed on the battery cell. Testing chamber 104 may be a temperature controlled environment that simulates a low temperature environment. The temperature within testing chamber 104 may be modified by master controller 114. In one embodiment, a group of battery cells of the same type are charged at room temperature (e.g., 20 degrees Celsius to 25 degrees Celsius) and then placed into testing chamber 104. The group of battery cells may be rested within testing chamber 104 until the group of battery cells reaches the ambient temperature within testing chamber 104. Each battery within the group of battery cells may be subsequently discharged at different discharge C-rates. During the discharging process, each of the batteries may have its discharge capacity and voltage monitored by measurement device 112. As a result of the monitoring, several data points may be generated. For example, a data point may indicate for a particular discharge C-rate at a particular temperature the discharge capacity at a given time.

Master controller 114 may calculate from the data points, for a particular temperature and battery cell type, a certain threshold discharge C-rate by determining a C-rate at which the discharge capacity reverses. At lower C-rates (i.e., lower C-rates than the threshold C-rate) the internal resistance will be dominant due to the low temperature of the battery cell. Thus as the discharge C-rate is increased, for example, from 0.1C until the threshold discharge C-rate, the discharge capacity may decrease because the internal resistance of the battery cell is dominant over the temperature increase generated by the discharge C-rate. Furthermore, as the discharge C-rate increases and capacity also decreases, the cut-off voltage of the battery cell may be reached quicker. However, at some point the heat generated from the discharge C-rate will be more dominant than the internal resistance of the battery cell. At this point, the discharge capacity may start to increase when compared to a discharge capacity of a lower C-rate. This inflection point may be referred to as the threshold discharge C-rate or the point at which the temperature increase from the discharge C-rate is dominant over the internal resistance of the battery cell.

Measurement device 112 may measure the voltage and discharge capacities of battery cells during a battery cell's discharge.

Master controller 114 may control one or more processes implemented by testing system 102. For example, master controller 114 may control the temperature setting within test chamber 104. In another example, master controller 114 may receive data from a timer and/or a temperature sensor within test chamber 104 to determine when one or more battery cells have reached the ambient temperature of test chamber 104. In another example, master controller 114 may receive from measurement devices (e.g., measurement device 112) a plurality of data points associated with battery cells. In such an example, master controller 114 may execute an application or logic that may compare the received data points to each other to determine a threshold discharging C-rate. In one embodiment, master controller 114 may communicate with one or more other parts of testing system 102 by various Internet of Things (IoT) communication protocols such as Message Queue Telemetry Transport (MQTT), Data Distribution Service (DDS), Bluetooth Low-Energy (BLE), Zigbee, WiFi, and the like. Master controller 114 may comprise one or more processors and non-volatile memory. The processor(s) may include single or multicore processors. The processor(s) may include general purpose microprocessors such as ones provided by Intel®, AMD®, ARM®, Freescale Semiconductor, Inc., and the like, that operate under the control of software stored in associated memory. One or more applications may be executed by the processor(s) to perform one or more operations of master controller 114.

Data store 106 may store one or more data points produced by testing system 102. The data points may include information from one or more processes performed by testing system 102. Data points may include for a battery cell tested: a battery cell type, a testing temperature, a discharge C-rate, detected voltage during discharge, detected capacity during discharge, and the like. In addition, data store 106 may also store a determined threshold discharge C-rate for a battery cell type. In one embodiment, data store 106 is internal to testing system 102. In one embodiment, data store 106 is external to testing system 102 and is connected to testing system 102 via network 108. In one embodiment, data store 106 is internal to one or more EVs 110A-110B. In such an embodiment, data store 106 may be a part of a battery management system (BMS) of an EV. Data store 106 may be implemented by a database, one or more servers, and the like. Data store 106 may be embodied by a physical storage device such as, a hard disk drive (HDD), solid state drive (SSD), and the like.

Network 108 may facilitate communications between the various systems depicted in FIG. 1. Network 108 can be of various types and can include (for example) the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, Bluetooth®, and other protocols. In general, network 108 may include any infrastructure that facilitates communications between the various systems depicted in FIG. 1. In one embodiment, network 108 may be implemented in a single communication network.

EVs 110A-110C may be EVs that utilize one or more data points produced by testing system 102. EVs 110-110C may be any type of electronic vehicle. An electronic vehicle may be any automotive vehicle that is fully or partially powered by a rechargeable battery. In one embodiment, when operating in cold weather (e.g., 25 degrees Celsius or lower) a BMS operating within EVs 110A-110C may query data store 106 to determine, based at least in part on the battery cell type implemented by the EV and a current temperature, a threshold discharge C-rate. In the depicted embodiment, EV 110A and EV 110B query data store 106 via a network 108 and EV 110C queries data store 106 outside network 108. In such an embodiment, data store 106 or one or more parts of data store 106 may be internal to EV 110C. For example, during the manufacturing of EV 110C, one or more data points within data store 106 may be input into EV 110C such that the BMS within EV 110C may reference threshold discharge C-rates at various temperatures according to the battery cell type implemented in EV 110C.

Figure 2:
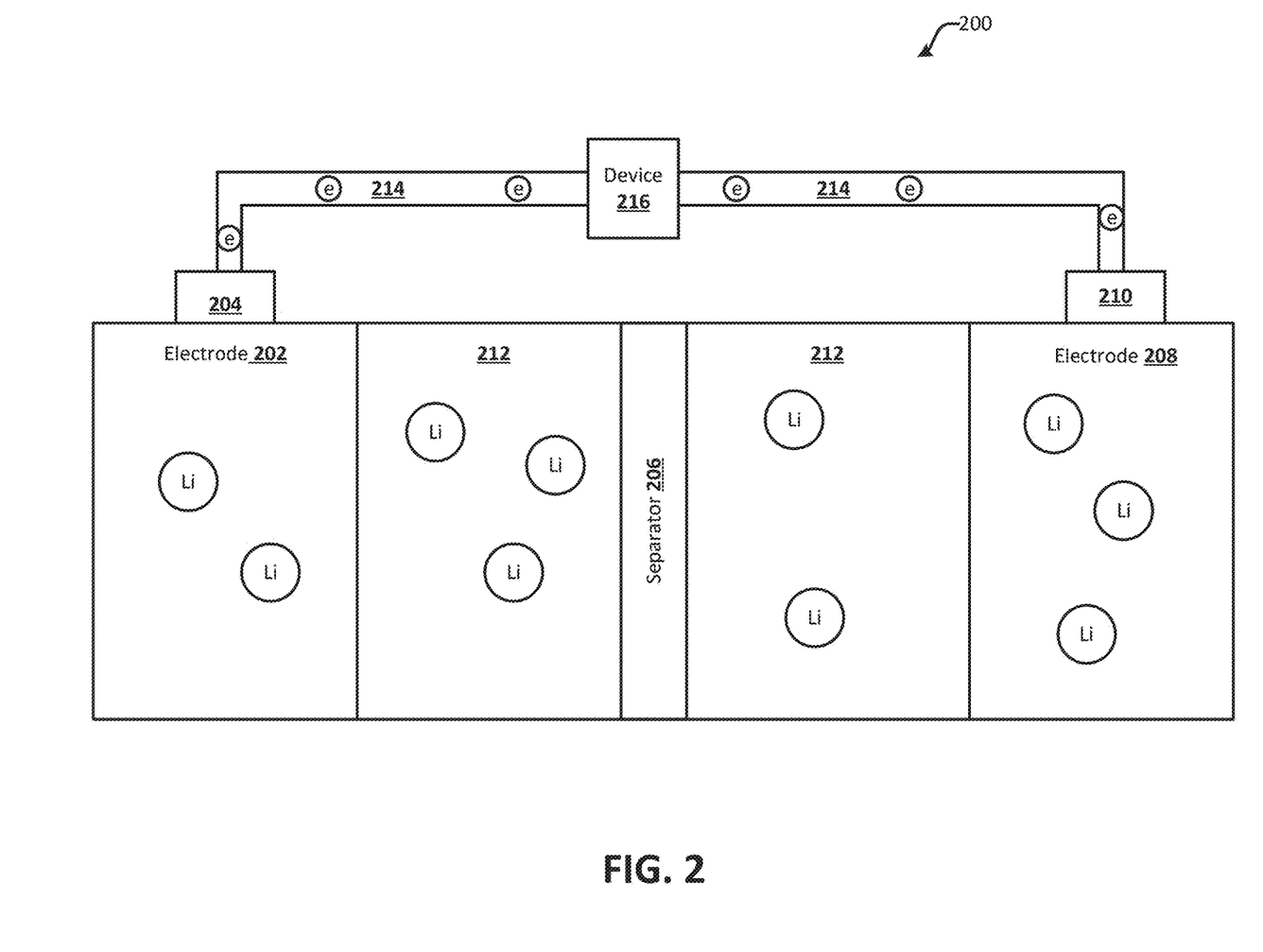
FIG. 2 depicts a battery cell in accordance with one or more embodiments.

FIG. 2 depicts example cell 200 that may be implemented by one or more embodiments. Cell 200 may be a cell within a Lithium ion (Li-ion) battery. Cell 200 produces electrical energy from chemical reactions. Cell 200 may be repeatedly charged and discharged. Cell 200 may comprise electrode 202, terminal 204, separator 206, electrode 208, terminal 210, electrolyte 212 and electron path 214.

Electrode 202 may be a positive electrode (e.g., an anode) comprised of different material types. For example, electrode 202 may be comprised of lithium-cobalt oxide (LiCoO$_2$), lithium iron phosphate (LiFePO$_4$), and/or another metal based alloy. Electrode 202 may, prior to the initiation of a charging process, contain a plurality of lithium ions. During the charging process, the lithium ions (e.g., positively charged lithium ions) within electrode 202 may flow, via electrolyte 212, through separator 206 to electrode 208. During a discharging process the opposite may take place and the lithium ions within electrode 208 may flow, via electrolyte 212, through separator 206 and back to electrode 202.

Terminal 204 may be a current collector attached to electrode 202. Terminal 204 may be a positive current collector. Terminal 204 may be comprised of various materials including, but not limited to, copper, nickel, and/or compounds including copper and/or nickel. During a charging process, lithium ions within electrode 202 may flow from electrode 202 and electrons may be released. These electrons may flow from electrode 202 to terminal 204 and then from terminal 204, via electron path 214, to terminal 210. Because current flows in the opposite direction of electrons, terminal 204 may collect current during the charging process.

Separator 206 may separate electrode 202 and electrode 208 while allowing lithium ions to flow between electrode 202 and electrode 208. Separator 206 may be a microporous isolator with little to no electrical conductivity. Separator 206 may also prevent the flow of electrons within electrolyte 212. By preventing electrons to flow within electrolyte 212, separator 206 may force electrons to flow via electron path 214.

Electrode 208 may be a negative electrode (e.g., a cathode) comprised of different material types. For example, electrode 208 may be comprised of carbon (e.g., graphite), cobalt, nickel, manganese, aluminum, and/or compounds including carbon, cobalt, nickel, manganese, and/or aluminum. Electrode 208 may, prior to the initiation of a charging process, contain none or a small amount of lithium ions. During the charging process, the lithium ions (e.g., positively charged lithium ions) within electrode 202 may flow, via electrolyte 212, through separator 206 and to electrode 208. During a discharging process, the opposite may take place and the lithium ions within electrode 208 may flow, via electrolyte 212, through separator 206 and to electrode 202.

Terminal 210 may be a current collector attached to electrode 208. Terminal 210 may be a negative current collector. Terminal 210 may be comprised of various materials including, but not limited to, aluminum and/or aluminum based compounds. During a charging process, electrons may flow from electrode 202 to terminal 204 and then from terminal 204, via electron path 214, to terminal 210. Because current flows in the opposite direction of electrons, terminal 210 may collect current during a discharging process (e.g., when lithium ions flow from electrode 208 to electrode 202).

Electrolyte 212 may be a solution of solvents, salts, and/or additivities that acts as a transport medium for lithium ions. Lithium ions may flow between electrodes 202 and 208 via electrolyte 212. In one embodiment, when an external voltage is applied to one of or both of electrodes 202 and 208 the ions in electrolyte 212 are attracted to an electrode with the opposite charge. For example, when external voltage is applied to cell 200, the lithium ions may flow from electrode 202 to electrode 208. The flow of ions within electrolyte 212 is due to the fact that electrolyte 212 has a high ionic conductivity due to the material make up of electrolyte 212. Electrolyte 212 may be comprised of various materials such as ethylene carbonate (EC), dimethyl carbonate (DMC), and/or lithium salts (e.g., LiClO$_4$, LiPF$_6$, and the like). In one embodiment, separator 206 may be submerged or partially submerged in electrolyte 212.

Electron path 214 may be a path through which electrons flow between electrode 202 and electrode 208. Separator 206 may allow the flow of lithium ions between electrode 202 and electrode 208 via electrolyte 212, but separator 206 may also prevent the flow of electrons between electrode 202 and electrode 208 via electrolyte 212. Because the electrons cannot flow via electrolyte 212, they instead flow between electrode 202 and electrode 208 via electron path 214. In one embodiment, device 216 may be attached to electron path 214 and during a discharging process the electrons flowing through electron path 214 (from electrode 208 to electrode 122) may power device 216. In one embodiment, device 216 may only be attached to electron path 214 during a discharge process. In such an embodiment, during a charging process when an external voltage is applied to cell 200, device 216 may be directly powered or partially powered by the external voltage source.

Device 216 may be a parasitic load attached to cell 200. Device 216 may operate based at least in part off of power produced by cell 200. Device 216 may be an electronic motor, and/or other vehicle components. Device 216 may not be a part of cell 200, but instead relies on cell 200 for electrical power. For example, device 216 may be an electronic motor that receives electric energy from cell 200 via electron path 214 and device 216 may convert the electric energy into mechanical energy to perform one or more functions such as acceleration in an EV. During a charging process, when an external power source is connected to cell 200, device 216 may be powered by the external power source (e.g., external to cell 200). During a discharging process, when an external power source is not connected to cell 200, device 216 may be powered by cell 200.

Figure 3A:
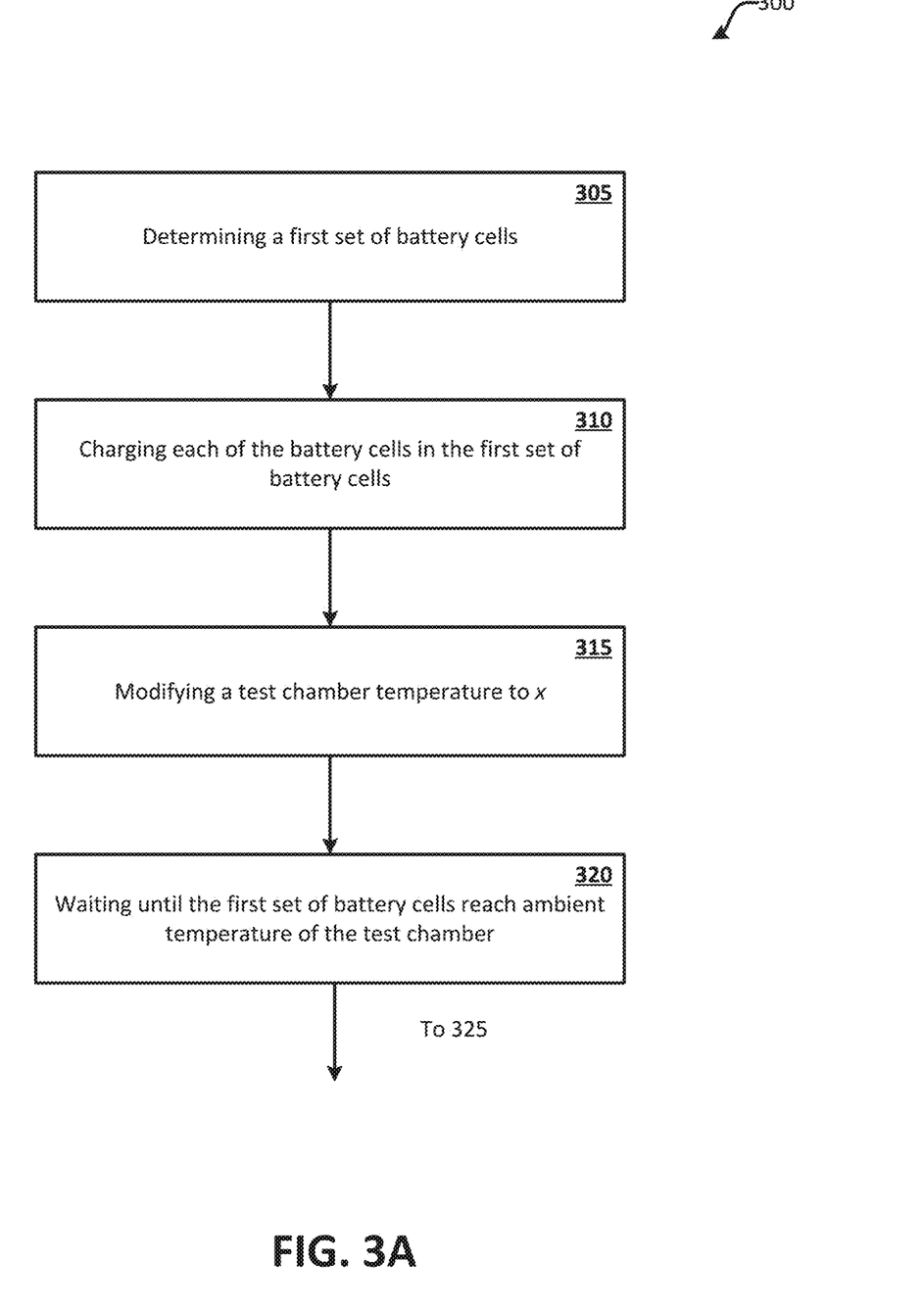
FIG. 3A illustrates a first process for determining a threshold discharging C-rate in accordance with one or more embodiments.
Figure 3B:
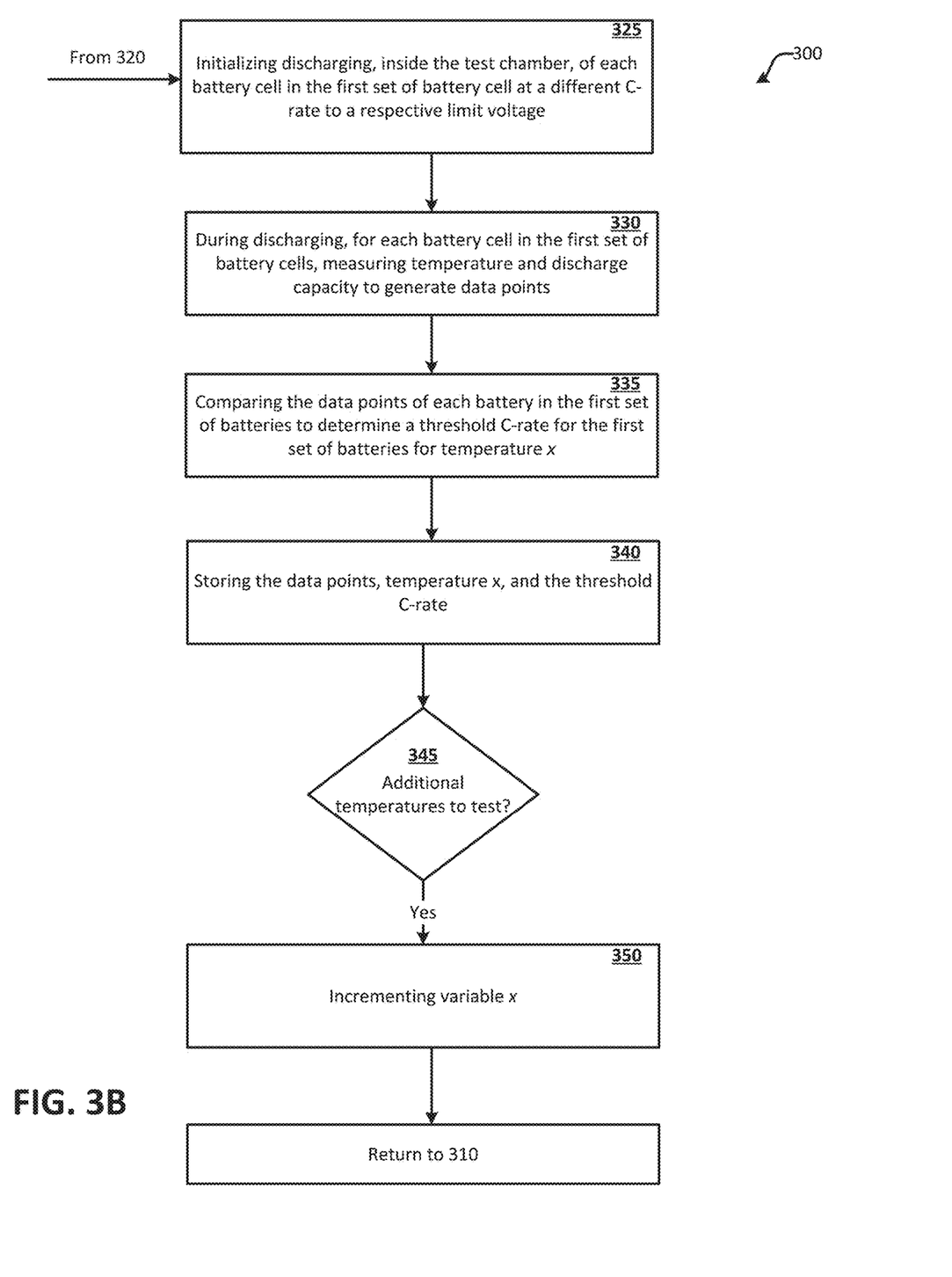
FIG. 3B illustrates a second process for determining a threshold discharging C-rate in accordance with one or more embodiments.

FIGS. 3A-3B depict process 300 for determining threshold discharge C-rates according to one or more embodiments. Process 300 may be implemented by one or more parts of a test system. The test system may include battery cells to be tested, devices that can detect voltage of a battery cell, devices that can detect discharge capacity of a battery cell, devices that can appropriate current to a battery cell, a temperature controlled test chamber, a master controller for data analysis and system controls, and other similar equipment. The test system may be fully or partially automated. Thus one or more aspects of process 300 may be performed by one or more machines. At 305, the test system determines a first set of battery cells to test. Each battery cell in the first set of battery cells may be of a same battery cell type. For example, each battery cell in the first set of battery cells may be a lithium cobalt oxide battery cell. In one embodiment, the first set of battery cells may comprise enough battery cells to simultaneously test a plurality of discharge C-rates such that each battery cell will only have one associated discharge C-rate. Thus if 20 discharge C-rates are to be tested then the first set of battery cells may include 20 battery cells. By associating each battery cell with only one discharge C-rate it may preserve the life of the battery cell.

At 310, the test system charges each of the battery cells in the first set of battery cells. Each battery cell may be fully charged at room temperature (e.g., between 20-25 degrees Celsius) or a similar temperature. In one embodiment, fully charged may mean that the state of charge (SoC) of the battery cell is at least 90%, 95%, and the like.

At 315, the test system modifies the temperature of a test chamber to x. X may be a variable that is capable of being changed during different iterations of process 300. In one embodiment, variable x may be any temperature between 25 degrees Celsius to −30 degrees Celsius. For sake of explanation, in the initial iteration of process 300 variable x may be initialized to 0 degrees Celsius. As a result, at 315 the test system modifies the temperature of the test chamber to 0 degrees Celsius. The test chamber may be a physical area capable of having its temperature regulated and maintained for an extended period of time (e.g., 1 day).

At 320, the test system waits until the first set of battery cells reach the ambient temperature of the test chamber. Subsequent to the test chamber being set to the desired temperature, the fully charged first set of battery cells may be placed inside the test chamber. In one embodiment, the first set of battery cells may be transported to the test chamber by a piece of automated machinery. In another embodiment, the first set of battery cells may be originally placed in the test chamber and the test chamber's initial temperature may be room temperature. Subsequent to fully charging the first set of battery cells, the temperature in the test chamber may be lowered until a desired temperature is reached. In such an embodiment, the first set of battery cells may not need to be transported after being fully charged. In one embodiment, in order to let the first set of battery cells reach the ambient temperature of the test chamber, the first set of battery cells are rested within the test chamber for a predetermined amount of time (e.g., 3 hours) or until the first set of battery cells are within a certain threshold of the ambient temperature of the test chamber (e.g., +−3 degrees).

At 325, the test system initializes discharging, inside the test chamber, of each battery cell in the first set of battery cells at a different discharge C-rate to a respective limit voltage. Each battery cell may have a different discharge C-rate. For example, a discharge C-rate may be 0.1C, 0.2C, 0.3C, 0.4C, 0.5C, 0.6C, 0.7C, 0.8C, 0.9C, 1C, 1.1C, 1.2C, 1.3C, 1.4C, 1.5C, 1.6C, 1.7C, 1.8C, 1.9C, or 2.0C. In such an example, a single battery cell would be discharged at a single discharge C-rate. For example, a first battery cell would be discharged at 0.1C, a second battery cell would be discharged at 0.2, and so forth. All battery cells may be discharged simultaneously within the test chamber.

At 330, the test system, during discharging for each battery cell in the first set of battery cells, measures battery cell temperature and discharge capacity to generate data points. While each of the battery cells are discharged at their corresponding discharge C-rate, the battery cell's temperature and the battery cell's discharge capacity are monitored and recorded. The temperature and discharge capacity may be monitored and measured for the duration of each battery cell's full discharge. A full discharge may mean discharging a battery cell to a respective cut-off voltage. The measurements recorded may be referred to as data points. There may be several data points for each battery cell.

At 335, the test system compares the data points for each battery cell in the first set of battery cells to determine a threshold discharge C-rate for the first set of battery cells for temperature x. The generated data points from 330 may be different for each tested battery cell because each tested battery cell had a different discharging C-rate. These data points may be compared and analyzed by different processes. In a first process, the discharge capacity of each battery cell may be averaged to determine an average discharging capacity associated with each battery cell. The average discharging capacity may then be plotted on a graph to locate an inflection point. The inflection point may be the first point on the graph, that the average discharging capacity associated with a battery cell with a first discharge C-rate is higher than the average discharging capacity associated with a battery cell with a second discharge C-rate. In one embodiment, the second discharge C-rate is the immediate C-rate below the first discharge C-rate. For example, the following discharge C-rates may be tested: 0.1C, 0.2C, 0.3C, 0.4C, 0.5C, 0.6C, 0.7C, 0.8C, 0.9C, 1C, 1.1C, 1.2C, 1.3C, 1.4C, 1.5C, 1.6C, 1.7C, 1.8C, 1.9C, and 2.0C. In such an example, there may be an inflection point if the average discharging capacity of a battery cell discharged at 1.2C is higher than the average discharging capacity of a battery cell discharged at 1.1C. In another embodiment, two or more prior discharge C-rates may be analyzed to determine the inflection point. In such an example, there may be an inflection point if the average discharging capacity of a battery cell discharged at 1.2C is higher than both the average discharging capacities of the battery cell at 1.1C and 1.0C. In a second process, the discharge capacity of each battery cell may be taken at a certain time (e.g., after 1 minute). This 1 minute discharge capacity may be plotted on a graph for each tested battery cell in order to determine an inflection point. In one embodiment, the discharge capacity of each battery cell may be taken at different time increments. For example, the discharge capacity of each battery cell may be taken in 2 minute increments, 3 minute increments, and the like. These sampled discharge capacities may be plotted on a graph for each tested battery cell in order to determine an inflection point.

Figure 4:
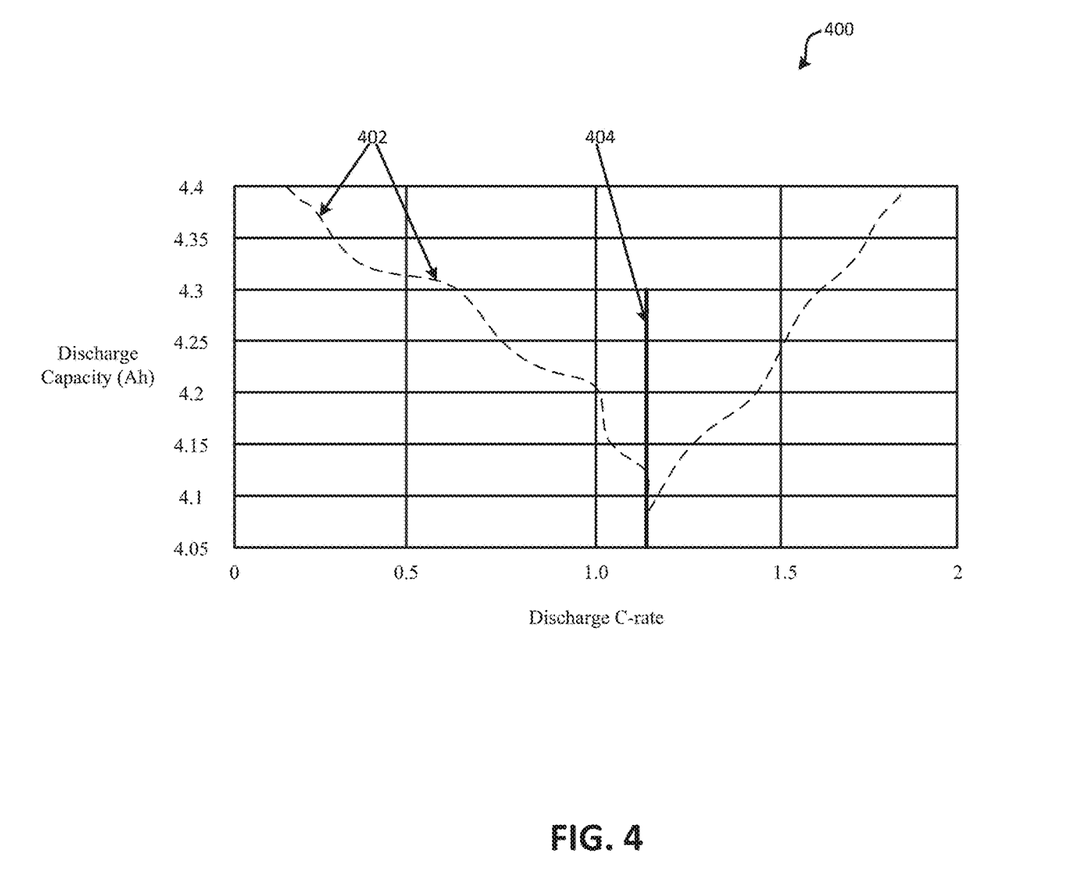
FIG. 4 illustrates an example data graph indicating a threshold discharging C-rate in accordance with one or more embodiments.

Now turning briefly to FIG. 4, FIG. 4 depicts an example graph 400 that may be produced by data points gathered from one or more processes associated with process 300. The x-axis of graph 400 is the tested discharging rates of a first set of battery cells. The y-axis of graph 400 is the measured discharging capacities of the first set of battery cells. Graph 400 may represent a first set of battery cells tested at 0 degrees Celsius. The data points plotted on graph 400 may be the average discharging capacity of each cell in the first set of battery cells or a time-specific discharging capacity (e.g., discharging capacity at 1 minute, 2 minute, etc.) of each battery cell in the first set of battery cells. As can be seen in graph 400, as the discharge C-rate increases from 0C to 1C the discharge capacity decreases. This is due to the fact that between 0C and 1C the internal resistance dominates the temperature rise of the discharging C-rate. Although the discharge capacity is higher at lower discharge C-rate (e.g., discharge capacity at 0C vs. discharge capacity at 0.5), discharging an EV battery cell with such a low discharging C-rate may result in little to no acceleration or power for motor of the EV. At the same time, as the discharge C-rate increases and the discharging capacity also decreases, the battery cell will more quickly approach its cut-off voltage and become empty. The data points within graph 400 indicate that 1.2C is the threshold discharging C-rate. As can be seen in graph 400, 1.2C represents an inflection point where the temperature rise within the battery cell is more dominant than the internal resistance, and thus the discharge capacity begins to rise (as compared to one or more prior discharging C-rate).

Now with returned attention to FIG. 3B, at 345, the test system stores the measured data points, test temperature, and determined threshold discharging C-rate. In one embodiment the data points, test temperature, and determined threshold discharging C-rate are stored in a data store that is remote from the test system. In one embodiment, only the threshold discharging C-rate is stored in the data store. In such an embodiment, the data store may be implemented as an internal piece of hardware within an EV, such that a BMS within the EV may query the data store during operation to modify the discharging C-rate of a battery within the EV.

At 350, the test system determines if there are additional temperatures to test. If so process 300 moves to 355 and variable x is incremented. X may be incremented by any amount (e.g. 1 degree, 5 degrees, 0.5 degrees and the like). In one embodiment, incrementing may mean reducing the value of x. For example, an initial value of x may be 0 degrees Celsius, and the value of x may be incremented by negative 5 degrees. After x is incremented, process 300 returns to 310 and a set of battery cells are selected. These battery cells may be the same battery cells or different battery cells.

Process 300 may be repeated to measure the same battery cell type at different temperatures and different discharging C-rates in order to determine threshold discharging C-rates for different temperatures for that particular battery cell type. In addition, process 300 may be repeated to measure different battery cell types such that threshold discharging C-rates are determined for a variety of battery cell types for a variety of temperatures. The following table (Table 1) contains example testing temperatures and discharging C-rates that may be used to determine threshold discharging C-rates of different battery cell types at different temperatures receives a temperature measurement associated with a battery. The temperature measurement may be received from a temperature sensor that measures the temperature of the battery. The battery may be utilized to power one or more parts of the EV, such as the motor of the EV.

Figure 5:
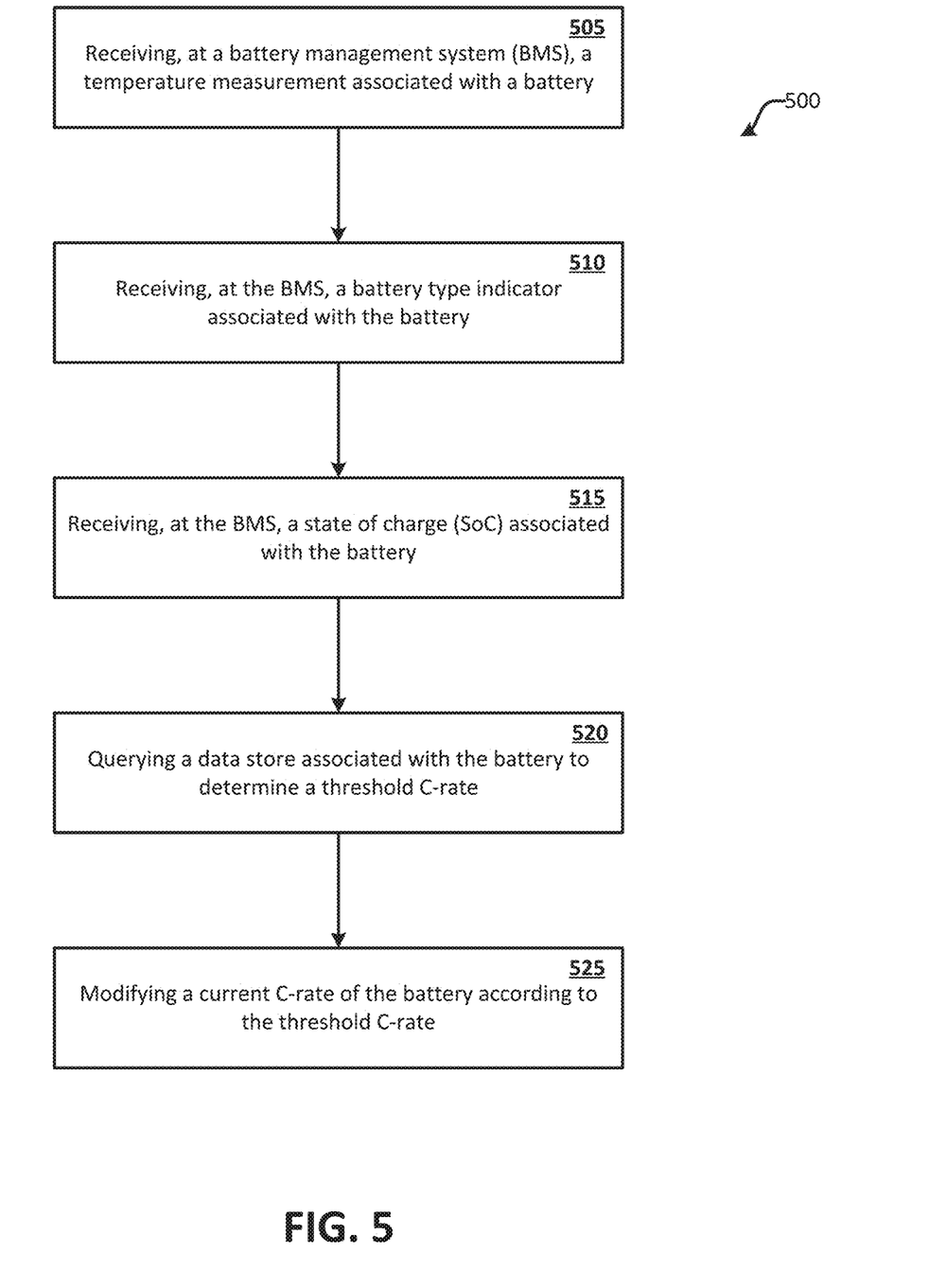
FIG. 5 depicts an example process for implementing a threshold discharging C-rate in accordance with one or more embodiments.

At 510, the BMS receives a battery type indicator associated with the battery. The battery type indicator may identify the battery cell type that comprises the battery. For example, the battery cell type may be a lithium cobalt oxide battery cell, a lithium manganese oxide battery cell, lithium iron phosphate battery cell, lithium nickel manganese cobalt oxide battery cell, lithium nickel cobalt aluminum oxide battery cell, lithium titanate, and the like. The battery type indicator may be encoded into one or more parts of the BMS at the time the battery or the EV was manufactured.

At 515, the BMS receives a SoC associated with the battery. The SoC may indicate the present battery capacity as a percentage of the maximum capacity. The SoC may be determined by various methods.

At 520, the BMS queries a data store associated with the battery to determine a threshold discharging C-rate. The query may be based on one or more parameters received at 505, 510, and/or 515. For example, the BMS may query the data store to determine a threshold discharging threshold C-rate for battery type A at the temperature of −20 degrees Celsius. In one embodiment, the BMS may round up or down the temperature measurement parameter to perform the query. In such an embodiment, the data store may only contain threshold discharging C-rates for degrees in increments of 5 (e.g., 0 degrees, −5 degrees, −10 degrees, and the like). As a result, if the temperature measurement parameter received at 505 does not correspond to a temperature within the data store, then BMS may round the received temperature measurement parameter. For example, if the received temperature measurement parameter is −18 degrees Celsius, then the BMS may round to −20 degrees Celsius and query the data store with the temperature measurement parameter of −20 degrees Celsius. In one embodiment, the data store may be physically located in the EV where the BMS and the battery are located. In one embodiment, the data store may be located at a remote location. In such an embodiment, the BMS may query the data store via a network to obtain the threshold discharging C-rate.

At 525, the BMS modifies a current discharging C-rate of the battery according to the threshold discharging C-rate. In one embodiment, an EV may be operated utilizing a current discharging C-rate and the BMS may modify the current discharging C-rate. In one embodiment, the threshold discharging C-rate may be utilized when an EV is operating in an enhanced power mode (e.g., sports mode). In one

TABLE 1

Example for Design of Experiments

| Testing Temperature | Discharge C-Rates | | | | | | | | | | | | | | | | | | | |
|---|---|---|---|---|---|---|---|---|---|---|---|---|---|---|---|---|---|---|---|---|
| 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
| −5 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
| −10 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
| −15 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |
| −20 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 |

Process 500 depicts an example process 500 for implementing a threshold discharging C-rate within an EV. Process 500 may be implemented by one or more parts of a BMS operating in conjunction with an EV. At 505, the BMS embodiment, the current discharging C-rate may not be modified to the threshold discharging C-rate. For example, the SoC received at 515 may indicate that a discharging C-rate may be operated at a higher discharging C-rate than the threshold discharging C-rate. In such an example, if an SoC is above a certain threshold (e.g., 75%) then the current discharging C-rate may be modified to be greater than the threshold discharging C-rate. By operating above a threshold discharging C-rate more discharging capacity may be achieve. Furthermore, due to the fact that the SoC is above a certain threshold there may be little worry of reaching a cut-off voltage (during the ramping up of the discharging C-rate) prior to the discharging capacity increasing.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method for modifying a discharging C-rate of a battery within an electronic vehicle (EV), comprising:
    charging a first battery cell of a plurality of battery cells to a threshold state of charge (SoC);
    subsequent to charging the first battery cell, placing the first battery cell in a temperature controlled environment for a predetermined period of time, wherein the temperature controlled environment is maintained at a first temperature;
    measuring, during a discharging of the first battery cell at a corresponding discharging C-rate, a battery cell temperature of the first battery cell and a battery cell discharge capacity of the first battery cell;
    comparing the measured battery cell temperature and the measured battery cell discharge capacity to other measured battery cell temperatures and other measured battery cell discharge capacities associated with battery cells of the plurality of battery cells to determine a threshold discharging C-rate at the first temperature; and
    modifying a discharging C-rate of one of the battery cells of the plurality of battery cells based at least in part on the threshold discharging C-rate.

2. The method of claim 1, further comprising: for each of the battery cells in the plurality of battery cells:
    measuring, during a discharging of each battery cell in the plurality of battery cells at a corresponding discharging C-rate and the first temperature, a battery cell temperature of each battery cell and a battery cell discharge capacity of each battery cell, wherein each discharging C-rate is different for each battery cell.

3. The method of claim 2, further comprising:
    modifying the temperature in the temperature controlled environment to a second temperature, wherein the second temperature is lower than the first temperature; and
for each of the battery cells in the plurality of battery cells; and
    measuring, during a discharging of each battery cell in the plurality of battery cells at a corresponding discharging C-rate and the second temperature, a battery cell temperature of each battery cell and a battery cell discharge capacity of each battery cell, wherein each discharging C-rate is different for each battery cell.

4. The method of claim 1, wherein the plurality of battery cells are all the same type of battery cells.

5. The method of claim 1, wherein the threshold SoC is 95%.

6. The method of claim 1, wherein the first temperature is 0 degrees Celsius or colder.

7. The method of claim 1, wherein the first temperature is −10 degrees Celsius or colder.

8. A non-transitory computer-readable storage medium having stored thereon instructions for causing at least one computer to modify a discharging C-rate of a battery within an electronic vehicle (EV), the instructions comprising:
charging a first battery cell of a plurality of battery cells to a threshold state of charge (SoC);
subsequent to charging the first battery cell, placing the first battery cell in a temperature controlled environment for a predetermined period of time, wherein the temperature controlled environment is maintained at a first temperature;
measuring, during a discharging of the first battery cell at a corresponding discharging C-rate, a battery cell temperature of the first battery cell and a battery cell discharge capacity of the first battery cell;
comparing the measured battery cell temperature and the measured battery cell discharge capacity to other measured battery cell temperatures and other measured battery cell discharge capacities associated with battery cells of the plurality of battery cells to determine a threshold discharging C-rate at the first temperature; and
modifying a discharging C-rate of one of the battery cells of the plurality of battery cells based at least in part on the threshold discharging C-rate.

9. The non-transitory computer-readable storage medium of claim 8, the instructions further comprising for each of the battery cells in the plurality of battery cells:
measuring, during a discharging of each battery cell in the plurality of battery cells at a corresponding discharging C-rate and the first temperature, a battery cell temperature of each battery cell and a battery cell discharge capacity of each battery cell, wherein each discharging C-rate is different for each battery cell.

10. The non-transitory computer-readable storage medium of claim 9, the instructions further comprising:
modifying the temperature in the temperature controlled environment to a second temperature, wherein the second temperature is lower than the first temperature; and
for each of the battery cells in the plurality of battery cells; and
measuring, during a discharging of each battery cell in the plurality of battery cells at a corresponding discharging C-rate and the second temperature, a battery cell temperature of each battery cell and a battery cell discharge capacity of each battery cell, wherein each discharging C-rate is different for each battery cell.

11. The non-transitory computer-readable storage medium of claim 8, wherein the plurality of battery cells are all the same type of battery cells.

12. The non-transitory computer-readable storage medium of claim 8, wherein the threshold SoC is 95%.

13. The non-transitory computer-readable storage medium of claim 8, wherein the first temperature is 0 degrees Celsius or colder.

14. The non-transitory computer-readable storage medium of claim 8, wherein the first temperature is −10 degrees Celsius or colder.

15. A system for modifying a discharging C-rate of a battery within an electronic vehicle (EV), comprising:
one or more processors; and
a memory coupled with the one or more processors, the memory configured to store instructions that when executed by the one or more processors cause the one or more processors to:
charge a first battery cell of a plurality of battery cells to a threshold state of charge (SoC);
subsequent to charging the first battery cell, place the first battery cell in a temperature controlled environment for a predetermined period of time, wherein the temperature controlled environment is maintained at a first temperature;
measure, during a discharging of the first battery cell at a corresponding discharging C-rate, a battery cell temperature of the first battery cell and a battery cell discharge capacity of the first battery cell;
compare the measured battery cell temperature and the measured battery cell discharge capacity to other measured battery cell temperatures and other measured battery cell discharge capacities associated with battery cells of the plurality of battery cells to determine a threshold discharging C-rate at the first temperature; and
modify a discharging C-rate of one of the battery cells of the plurality of battery cells EV based at least in part on the threshold discharging C-rate.

16. The system of claim 1, wherein the instructions that when executed by the one or more processors further cause the one or more processors to for each of the battery cells in the plurality of battery cells:
measure, during a discharging of each battery cell in the plurality of battery cells at a corresponding discharging C-rate and the first temperature, a battery cell temperature of each battery cell and a battery cell discharge capacity of each battery cell, wherein each discharging C-rate is different for each battery cell.

17. The system of claim 16, wherein the instructions that when executed by the one or more processors further cause the one or more processors to:
modify the temperature in the temperature controlled environment to a second temperature, wherein the second temperature is lower than the first temperature; and
for each of the battery cells in the plurality of battery cells; and
measuring, during a discharging of each battery cell in the plurality of battery cells at a corresponding discharging C-rate and the second temperature, a battery cell temperature of each battery cell and a battery cell discharge capacity of each battery cell, wherein each discharging C-rate is different for each battery cell.

18. The system of claim 15, wherein the plurality of battery cells are all the same type of battery cells.

19. The system of claim 15, wherein the threshold SoC is 95%.

20. The system of claim 15, wherein the first temperature is 0 degrees Celsius or colder.

* * * * *